Aug. 24, 1965  ALI UMIT KUTSAY  3,201,977
STRAIN GAUGE
Filed Feb. 20, 1961  3 Sheets-Sheet 1
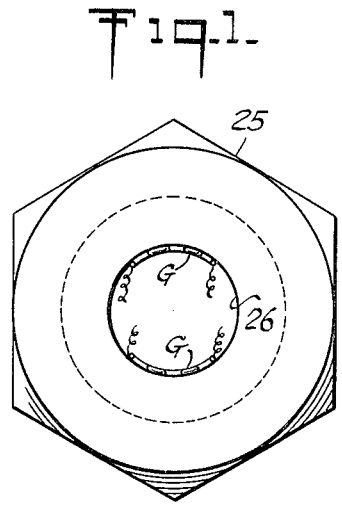
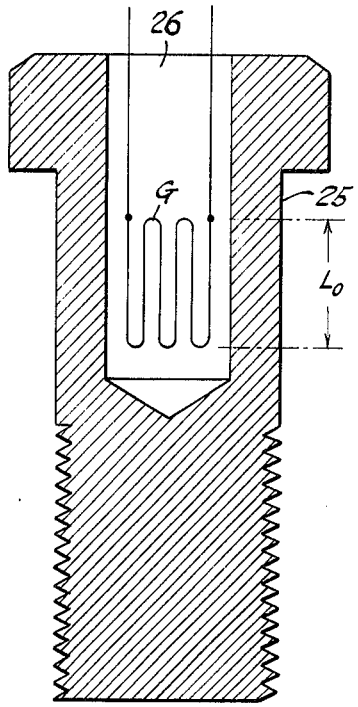
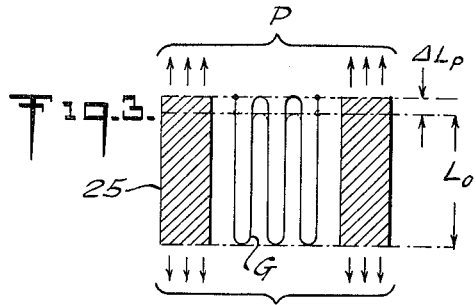
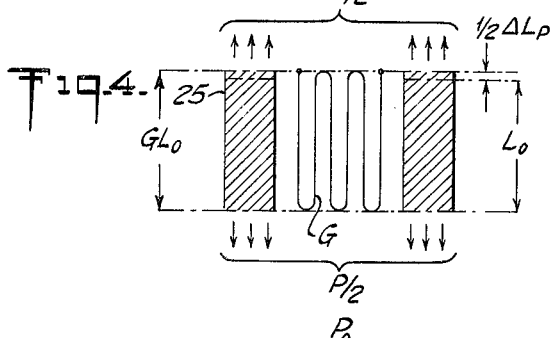
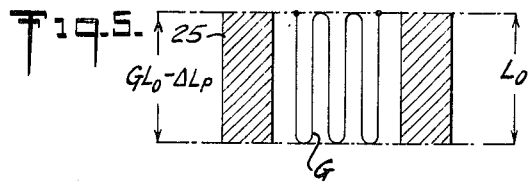
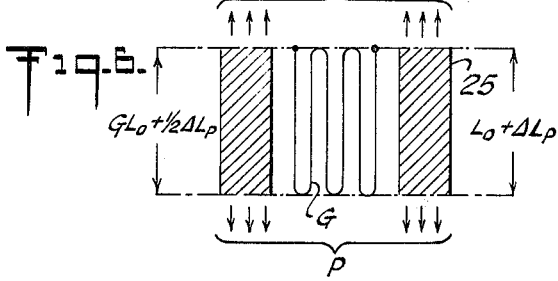
INVENTOR
ALI UMIT KUTSAY
BY
ATTORNEY

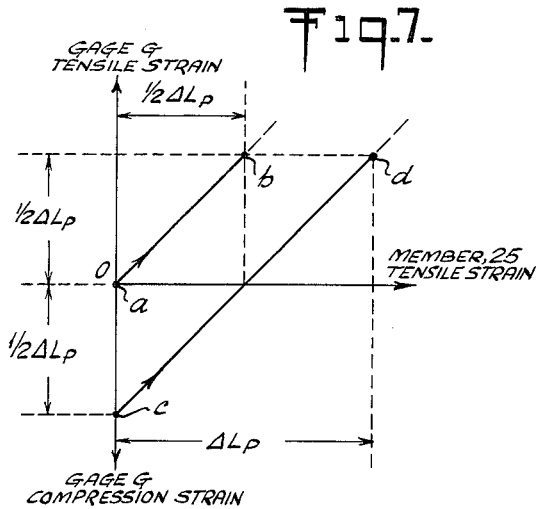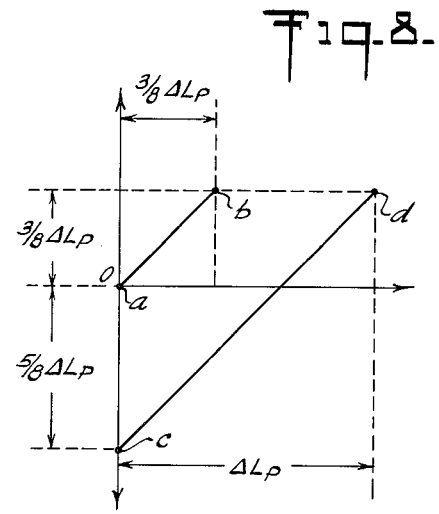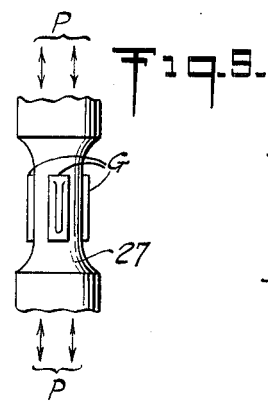

Aug. 24, 1965         ALI UMIT KUTSAY              3,201,977
                        STRAIN GAUGE
Filed Feb. 20, 1961                          3 Sheets-Sheet 3
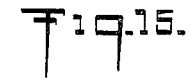
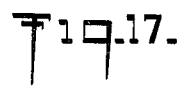
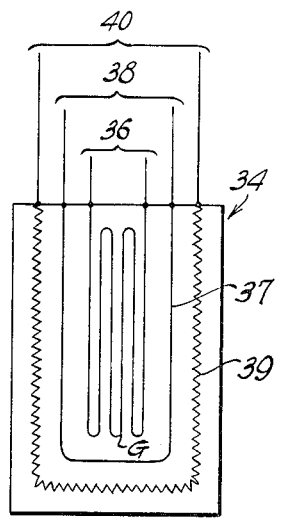
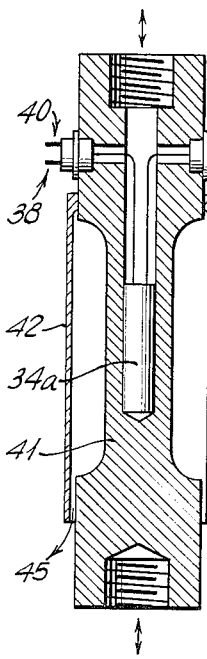
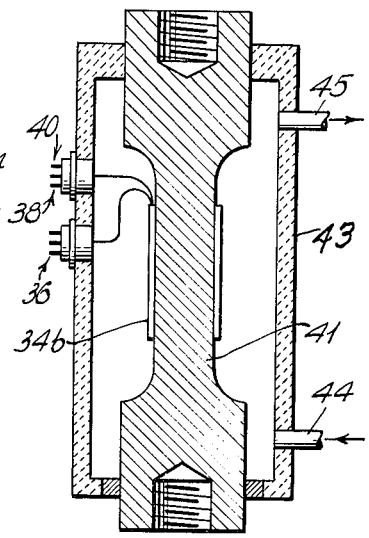
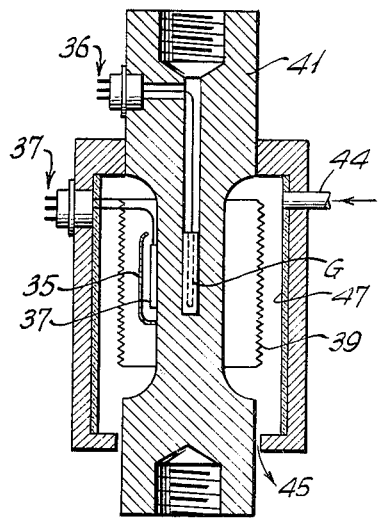
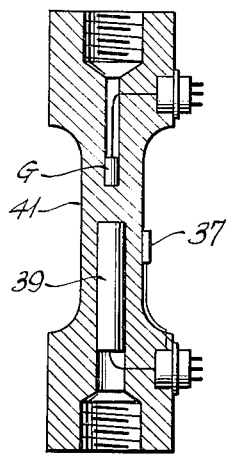
INVENTOR
ALI UMIT KUTSAY
BY
ATTORNEY United States Patent Office 3,201,977
Patented Aug. 24, 1965

3,201,977
STRAIN GAUGE
Ali Umit Kutsay, 3520 Lewis Road, Newtown Square, Pa.
Filed Feb. 20, 1961, Ser. No. 90,550
8 Claims. (Cl. 73—88.5)

The present invention relates to improvements in strain gauging apparatus.

With the widespread utilization of the electrical resistance versus strain characteristics of various conducting or semi-conducting materials for the measurement of stresses in related structures under test, a principal field involves the use of gauging transducer units such as "load cells," "pressure cells," "stress-sensitive bolts," etc., each consisting of a load-carrying member of one form or another to which has been bonded one or more strain gauge elements of fine electrical wire, ribbon, or the like. However, in the art as hitherto practiced these devices have been subject to certain operational drawbacks such as inadequate useful range, a tendency to initial lag in response to the load as it is applied, and loss of accuracy when subjected to conditions of temperature change. This invention has as one of its objects the provision of an improved strain gauging transducer having greatly increased useful operative range and a high degree of accuracy throughout such increased range.

Another object of the invention resides in the provision of a novel and improved device for measuring stresses in mechanical members that affords a high degree of precision under widely varying operating conditions.

Still another object of the invention resides in the provision of novel and improved apparatus for the measurement of strains and stresses that is characterized by its versatility, dependability and substantially uniform sensitivity over an extended operating range.

Still another object of the invention resides in the provision of improved temperature controlled apparatus for measurement of strains and stresses.

Other objects and advantages of the invention will become evident during the course of the following description in connection with the accompanying drawing, in which FIG. 1 is a top view of a bolt-type transducer equipped with an internal strain gauge;

FIG. 2 is a longitudinal cross-sectional view of FIG. 1 taken along the line 1—1 thereof;

FIGS. 3, 4, 5, and 6 are diagrammatic views of the active gauging zone of the transducer illustrative of various conditions pertinent to the operation of the invention;

FIG. 7 illustrates graphically the typical increased operative range provided by the invention;

FIG. 8 is a similar diagram illustrating an alternative proportioning of the compressive and tensile regions within the gauge element's range;

FIGS. 9, 10, and 11, respectively, illustrate exterior applications of the gauging elements to an axially stressed member, a bending beam, and a torsion bar;

FIG. 12 is a cross-sectional view of an embodiment of the invention for measuring exterior gaseous or liquid pressures;

FIG. 13 is a transducer similar to FIG. 12 for the measurement of internal pressures;

FIG. 14 is a cross-sectional view of another embodiment of the invention generally similar to that of FIG. 12 but adapted to operation under very high pressures;

FIG. 15 illustrates improved strain gauge apparatus in accordance with the invention for minimizing gauging errors resulting from temperature variations; and FIGS. 16, 17, 18, and 19 show various alternative forms and arrangements of the parts making up the temperature controlled strain gauge transducer in accordance with the invention and illustrating its ready adaptability to a wide variety of manufacturing and operating conditions.

Referring to FIGS. 1 and 2, the numeral 25 indicates a bolt having a longitudinal hole 26 drilled concentrically in the line of its neutral axis. One or more electroresistive strain gauge elements G, cemented or otherwise secured to the wall of the hole 26, establish a longitudinal gauging zone of length appropriately defined as $L_o$ when no longitudinal stress is applied to the bolt, the electrical resistance of the gauge in this condition being similarly defined as $R_o$. When a tensional load P is placed on the bolt 25 as illustrated in FIG. 3, the material of the bolt in the gauging zone will be increased from $L_o$ to a length $L_o + \Delta L_p$. So long as the applied stress P does not exceed the elastic limit of the bolt material, the increase $\Delta L_p$ in length will be proportional to P. At the same time, if the increase in length $\Delta L_p$ of the bolt material does not exceed the elastic strength of either the strain gauge material or the material bonding it to the bolt, the strain gauge length will be increased by an identical amount $\Delta L_p$ with a corresponding increase in resistance from $R_o$ to $R_o + \Delta R_p$, so that the response of the strain gauge circuit will furnish an accurate indication of the stress placed on the bolt.

The present invention takes particular cognizance of the second factor cited above, namely, the limit of the ability of the strain gauge material and bond to follow faithfully the strain of the material to which they are attached. With the usual attachment of a strain gauge to a pressure member while both are in unstressed condition, the useful range through which the pressure member may be stressed with acceptable response of the gauge is limited to that imposed by the limitations of the gauge itself when strained in the same direction as the pressure member, for example in tension as illustrated in FIG. 3. However, in the present general state of the art the ultimate strength of various pressure members, such as high quality steel bolts, is such as to allow them to withstand strain substantially greater than known strain gauge structures. This discrepancy becomes more pronounced in the cases of pressure members made of alloys such as those of titanium and beryllium, which will withstand greater deformation under the same stress, due to their lower modulus of elasticity in comparison to steel. It will be evident, therefore, that in such cases strain gauges as hitherto utilized are incapable of producing accurate strain indications throughout the entire elastic ranges of the pressure members.

One example of the method and means by which the present invention overcomes the deficiencies of known devices will now be described in connection with the structure shown in FIG. 4. Prior to attachment of the gauge G to the bolt 25 the latter is placed under tensile stress as for instance a stress $P/2$, causing the length of bolt material in the intended gauging zone to increase from $L_o$ to $(L_o + \frac{1}{2}\Delta L_p)$. The bolt is maintained in this stressed condition while an unstressed gauge G is cemented or otherwise bonded thereto, the unstressed length $GL_o$ of the gauge being equal to the extended zone length ($L_0 + \frac{1}{2}\Delta L_p$) noted above. The bolt is held in the same stressed and strained state until the bonding material has completely set, i.e., until the gauge is permanently bonded to the pressure member. Thereafter, as illustrated in FIG. 5, when the stress is removed from the bolt 25 the material in the latter's gauging zone contracts to its no-load length $L_0$. Since the gauge is intimately secured to the bolt, the length of the gauge is similarly reduced from its "zero" or unstrained length $GL_0$ to ($GL_0 - \frac{1}{2}\Delta L_p$), corresponding to a reduction in resistance from $R_0$ to ($R_0 - \frac{1}{2}\Delta R_0$). Thus in the normal or unstressed condition of the bolt 25 the gauge G remains strained in compression to the extent $\frac{1}{2}\Delta L_p$.

When the tensional load P is later applied to the transducer assembled as described above, the bolt material length in the gauging zone increases as before from $L_0$ to ($L_0 + \Delta L_p$). At the same time, however, the strain gauge length changes from ($GL_0 - \frac{1}{2}\Delta L_p$) to ($GL_0 - \frac{1}{2}\Delta L_p + \Delta L_p$)

or to ($GL_0 + \frac{1}{2}\Delta L_p$). Thus in gauging the entire tensional transducer strain of $L_p$, the strain in the gauge combination is divided between the gauge's compressive and tensional conditions, at no time changing from the "zero" or unstressed point by more than one-half the overall strain $L_p$. It will accordingly be evident that if $\frac{1}{2}\Delta L_p$ were taken as the limit of the usable range of the strain-gauge-bond combination, twice the corresponding stress can be measured in the bolt without exceeding the safe limits of the gauge combination. For instance, ordinary present day strain gauges of long-term stability and desirable accuracy may be used satisfactorily for stresses up to 85,000 p.s.i. when installed on steel elements. On the other hand, such gauges embodied in the present invention would operate perfectly satisfactorily up to $2 \times 85,000$ or 170,000 p.s.i.

The above relationships between prior practice and the present invention are illustrated graphically in FIG. 7, in which the ordinates represent strains in the gauge G while the abscissae indicate strain in the loaded or stressed member, the latter strain being assumed to be in tension in correspondence with the foregoing explanation. The upper 45 degree line $a$–$b$ extending from the intersection of the coordinate axes represents the conditions in prior transducers, while the lower diagonal $c$–$d$ similarly represents conditions in a transducer of the present invention, the downward displacement of the starting point $c$ from the zero gauge strain point being illustrative of the previously described compressive pre-strain established in the gauge. Since in each case the gauges follow exactly the extension of the load member when the latter is stressed in tension, it will be evident that the projections of the diagonals $a$–$b$ and $c$–$d$ on the horizontal axis indicate the safe operative ranges of the old and new transducers respectively, showing that the new type in the present example provides twice the range of the old.

While the foregoing description has used a pre-strain to total range ratio of one-half, it will be understood that this particular figure was employed purely as an example for simplicity and clarity in explanation, as any other desired ratio may be used to advantage to suit particular conditions. For illustration, some strain gauge installations in general are stronger and therefore have greater allowable limits in compression than in tension. To utilize the capabilities of the gauge materials to the utmost in such installations, the use of a pre-strain to total range ratio other than one-half may be made as shown graphically in FIG. 8. FIG. 8 is similar to FIG. 7 except that the gauge pre-strain is $\frac{5}{8}\Delta L_p$ and the maximum tensile strain is $\frac{3}{8}\Delta L_p$. It will be seen, however, that the total range $\Delta L_p$ is still achieved, i.e., the greater compressional bias compensates for the smaller tensional capabilities of the gauge installation. It will also be seen that the range for tensional measurement provided by the construction of the present invention in this example is 2.66 times that of the old type of transducer.

While the use of a strain gauge with a bolt 25 has been used in the foregoing description of one embodiment of the invention, it is to be understood that the principles and practice of the invention are similarly applicable to load cells, weighing devices, all strain gauge transducers for measuring force, impact, shock, pressure, vibration, etc., the pre-strain bias, either compressive or tensile, being tailored in each case to provide optimum result in the particular application. Thus, in the case of FIG. 9, which shows an axially stressed member 27, gauges G have been bonded thereto while the member was held under either tension or compression, dependent on whether the service stress to be measured is tensile or compressive. In the further case of alternating tensile and compressive loads, as in some types of vibrational installations, the pre-strain is so chosen as to adjust the optimum gauge range to the composite loading strain range between the alternating stress conditions. Other illustrations of exterior applications of gauges G to different types of load members include FIG. 10, which shows a cantilever beam 28 intended to be stressed in bending, and FIG. 11 depicting application to a torsion bar 29.

Specific examples of application of the invention to transducers for measurement of fluid pressures, either gaseous or liquid, are shown in FIGURES 12, 13 and 14, as previously mentioned. In FIG. 12 the numeral 30 indicates a hollow dome-shaped housing or pressure member secured in the wall 31 of a pressure vessel 31a so as to extend outside the vessel. To complete the strain gauging combination, the interior of the housing 30 is subjected to the type of pressure FP to be measured, thereby expanding the housing, and the gauges G are bonded to the exterior thereof as shown, the pressure FP being maintained until the bonding has completely set as before. Thereafter, when the pressure is removed the housing contracts to normal, thus creating a compressive pre-strain in the gauges G. In the manufacture of the device a suitable pressure vessel such as the vessel 31a is used in setting up the pre-strained condition. In this way the completely conditioned transducer combination may be shipped ready for simple installation and use at any desired location in which the actual measuring function is to be carried on.

The type of transducer shown in FIG. 13 is similar to that of FIG. 12 except that the housing 30 is arranged to protrude from the inner side of the vessel wall 31, and the gauges G are bonded to the inside of the housing while the pressure FP is maintained in the exterior thereof. As a result, when the pressure is removed the expansion of the housing 30 places the gauges G under the tensile pre-strain. In both these types of pressure-measuring transducers, it is evident that the availability of the entire optimum operative gauge range, including both the compressive and tensile stresses presents distinct advantages over prior known devices.

The further variation shown in FIG. 14 is a form of pressure transducer suitable for use in a manner comparable to that of FIGURE 13, but suitable for still higher pressure applications. In this case the gauges G are placed within the housing 32 which is then initially strained by means of a stepped plug 33, pressed into the housing with an interference fit. With this construction, not only are the gauges G prestrained in tension by reason of the introduction of the plug 33, but the plug also supports and reinforces the housing 32 when the latter is strained under test pressure. These two factors cooperate to reduce the stress and strain produced at the gauges G for a given maximum pressure applied externally, thus rendering the device suitable for use with very high pressures as previously noted.

Known gauging devices, as previously discussed, have been found to be inaccurate when used under conditions wherein temperature variations are experienced. This results principally from the characteristics of the material from which the gauging element is formed. This invention affords means for minimizing temperature effects and improved structures are illustrated in FIGURES 15 to 19. FIGURE 15 depicts diagrammatically a triple element 34 consisting of a strain gauge G (wire, foil or piezo-resistive) for inclusion in a metering circuit 36, a thermostatic detecting element 37 included in a circuit 38, and a heating element 39 for inclusion in a supply circuit 40, the heating circuit being controllable in any well-known manner by the thermostatic circuit. The composite unit 34 may be made in the form of a cartridge 34a as shown axially installed in a load carrying column 41 in FIG. 16, or as a flat flexible band 34b which may be bonded to the outer circumference of the column as shown in FIG. 17. Thermal insulating jackets 42 and 43 in FIGS. 16 and 17, respectively, are provided with inlets 44 and outlets 45 for the circulation of temperature controlled air or other fluid about the columns 41 when required by particular test conditions, this circulation also being thermostatically controlled by means well known in the control art and hence requiring no detail description herein. In the variation of load cell construction shown in FIG. 18 the gauging, heating and control elements are mounted separately, the gauge G being mounted within the bar 41, the thermostatic element 37 on the outer circumference of the bar and provided with an exterior heat shield 35, and the heating element 39 in concentric relation in the annular space between the bar and an insulating sleeve 47 lining the outer jacket.

In all the forms illustrated in FIGS. 16, 17 and 18 the operation is substantially the same, namely, the thermostat controls the heating or cooling, as the case may be, to maintain the temperature of the parts in the gauging zone effectively constant irrespective of the temperature of the surrounding environment, so that changes in gauge resistance occur solely in response to changes in strain, without any of the previously noted complicating temperature factors usually destructive of accuracy. This stability, particularly in conjunction with the previously described selective pre-straining of the gauge elements, insures a strain gauge transducer structure of maximum operative accuracy greatly augmented throughout operating ranges and under conditions well beyond the capabilities of prior devices. It will be understood, as previously mentioned, that the types given herein are examples of a wide variety of forms in which the device may be constructed, and are also in themselves susceptible to further detail changes for particular purposes. For example, FIGURE 19 illustrates a temperature-controlled transducer in which the gauge G and the heater 39, both in cartridge form, are mounted axially but separately in the bar 41, while the thermostatic element 37 is mounted on the outside of the bar. Obviously, however, the element 37 may be combined in a single interior mounting with the heater element. Also, in certain large installations the thermostatic sensing element, instead of being electrical, may be the small "feeler" tube of a fluid pressure thermostat. Thus, while the invention has been set forth in preferred forms, it is not limited to the exact embodiments illustrated, as various changes and modifications may be made without departing from the spirit of the invention within the scope of the appended claims.

What is claimed is:

1. In a unitary strain gauge assembly, a load carrying member, an electrical strain gauge element secured to the load carrying member in direct cooperative straining relation therewith, heating means and thermostatic detecting means, said heating means and detecting means being substantially unaffected by load stresses and disposed in intimate thermal relation with said strain gauge element to maintain said strain gauge element and adjacent portions of said load carrying member at a substantially constant temperature.

2. In a unitary strain gauge assembly, a load carrying member, an electrical strain gauge element secured to the load carrying member in direct cooperative straining relation therewith, electric heating means and thermostatic detecting means, said electric heating means and detecting means being substantially unaffected by load stresses and disposed in intimate thermal relation with said strain gauge element to maintain said strain gauge element and adjacent portions of said load carrying member at a substantially constant temperature.

3. In a unitary strain gauge assembly according to claim 2 wherein said strain gauge, heating means and detecting means are mounted within at least one capsule with said strain gauge element being mounted in cooperative straining relation with the wall of said capsule, said load carrying member includes an axial opening and said capsule is mounted in said opening and in cooperative straining relation therewith.

4. In a unitary strain gauge assembly according to claim 2 wherein said load carrying member is at least partially enclosed by a non-load bearing protective jacket.

5. In a unitary strain gauge assembly according to claim 2 wherein said load carrying member includes an axial opening, said electrical strain gauge element is mounted in said opening and said electric heater surrounds said load carrying member, and wherein said assembly further includes a protective jacket inclosing said heating element and at least part of said load carrying member.

6. In strain gauging apparatus, in combination, a load-carrying member adapted to be subjected to stresses productive of strains therein in alternatively opposite operational directions, said load carrying member having a hole formed therein with the axis thereof coincident with the neutral axis of said load carrying member, an electrical strain gauge element having an optimum operative range including compressive and tensile strain regions, and bonding means securing said gauge element directly to the wall of said opening in said load-carrying member in direct cooperative straining relation therewith, said gauge element being pre-strained throughout a predetermined portion of the greater of said unequal range regions when said load-carrying member is in unstressed condition, whereby said optimum operative range of said element may be operationally aligned with the composite range of said alternatively opposite strains to be produced in said load-carrying member.

7. The combination according to claim 6 including thermostatically controlled means disposed in intimate thermal relation with said gauge element and said load-carrying member for maintaining said element and the adjacent zone of said member at substantially constant temperature independently of changes in exterior temperature.

8. In strain gauging transducer apparatus, in combination, electrical strain gauge means having an operational range including compressive and tensional regions extending in opposite operational directions from a point of zero strain, load-carrying means adapted to be subjected to load stress and resulting strain and having an opening therein coincident with its neutral axis, means securing said gauge means in the opening in said load-carrying means and in directly cooperative straining motional relation therewith and adapted to hold said gauging means strain biased from said zero point in one of said directions when said load-carrying means is in unstressed condition, whereby subsequent strain of said load-carrying means resulting from load stress applied thereto in said opposite direction may move said gauge means from said region of strain bias through said zero strain point and into said opposite directional strain region, and thermostatically controlled means disposed in intimate thermal relation with said gauge means and said load-carrying means for maintaining said gauge means and the adjacent zone of said load-carrying means at substantially constant temperature independently of changes in exterior temperature.

References Cited by the Examiner

UNITED STATES PATENTS

| | | | |
|---|---|---|---|
| 2,423,867 | 7/47 | Zener et al. | 73—88.5 |
| 2,434,628 | 1/48 | Simmons | 29—155.68 |
| 2,472,045 | 5/49 | Gibbons | 73—88.5 X |
| 2,488,347 | 11/49 | Thurston | 73—141 X |
| 2,548,592 | 4/51 | De Michele | 29—155.68 |
| 2,743,420 | 4/56 | Haldeman | 324—62 X |
| 2,813,958 | 11/57 | MacDonald | 338—5 |
| 2,873,341 | 2/59 | Kutsay | 338—6 |
| 2,920,298 | 1/60 | Hines | 73—88.5 X |
| 2,933,707 | 4/60 | Blystone et al. | 73—398 X |
| 3,102,420 | 9/63 | Mason | 73—88.5 |

FOREIGN PATENTS

| | | |
|---|---|---|
| 981,199 | 1/51 | France. |
| 1,022,513 | 12/52 | France. |

RICHARD C. QUEISSER, *Primary Examiner.*
ROBERT L. EVANS, DAVID SCHONBERG,
*Examiners.*